June 17, 1958 R. W. TRIPP 2,839,711
AUTOMATIC SHAFT CONTROL
Filed Oct. 17, 1955 8 Sheets-Sheet 2
Fig. 2.
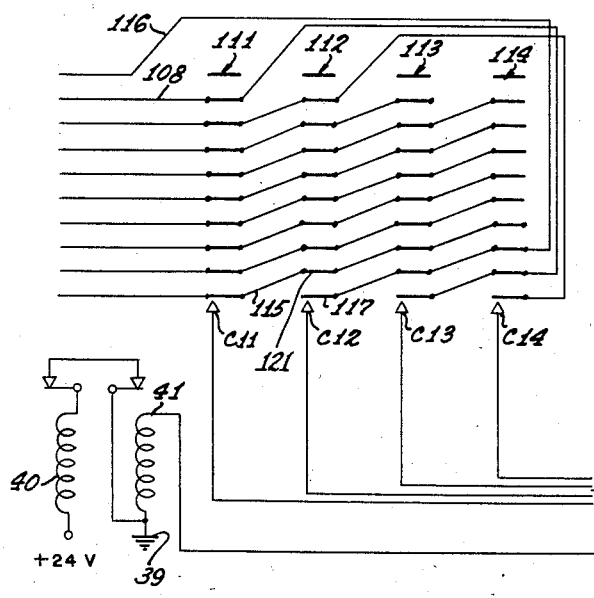
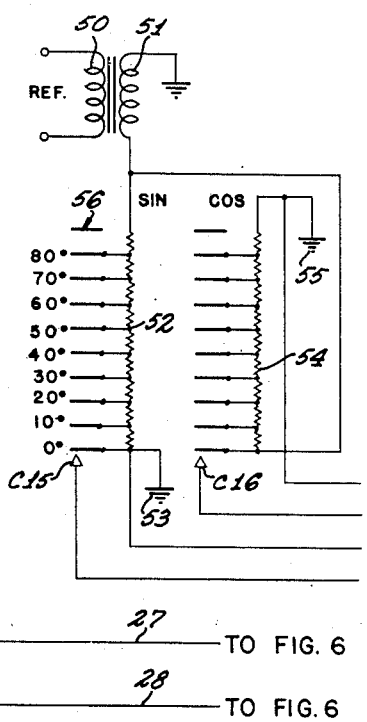
ROBERT W. TRIPP,
INVENTOR.
BY
ATTORNEY.

ROBERT W. TRIPP,
INVENTOR.

BY W E Beatty

ATTORNEY.

June 17, 1958  R. W. TRIPP  2,839,711
AUTOMATIC SHAFT CONTROL
Filed Oct. 17, 1955  8 Sheets-Sheet 8

ROBERT W. TRIPP,
INVENTOR.

BY W E Beatty

ATTORNEY.

ial to the
United States Patent Office 2,839,711
Patented June 17, 1958

2,839,711

AUTOMATIC SHAFT CONTROL

Robert W. Tripp, Bronxville, N. Y., assignor, by mesne assignments, to Inductosyn Corporation, Carson City, Nev., a corporation of Nevada Application October 17, 1955, Serial No. 540,748

13 Claims. (Cl. 318—162)

This invention relates to a digital-to-analog converter for employing angular input information and for producing voltages representing the angular position of a shaft.

An object of the invention is to provide an angular digital-to-analog converter which will accept the input information in discrete angular steps while obtaining high accuracy of the corresponding angular position of a shaft.

A further object is to provide an angular digital-to-analog converter wherein the input angular steps are supplied on a decimal basis.

Another object is to provide a digital-to-analog converter of the type described wherein the input information serves to control data elements operating at so-called different "speeds," here referred to as coarse or "low speed" and fine or "high speed" data elements. See vol. 25, Radiation Laboratory Series, "Theory of servo-mechanisms" by James et al., published 1947 by McGraw-Hill Book Co. Pages 81–88 define "speed" and disclose a "synchronizing" circuit for dual-speed which may be used here. Also, this book discloses known servo techniques which may be used.

It is a further object of the invention to overlap the operation of the coarse and fine data elements.

Each of the data elements in question includes a quadrature winding. The coarse data element may be a conventional two-pole resolver or it may be a position measuring transformer of the type described and claimed in patent application Serial No. 536,464 filed September 26, 1955 by R. W. Tripp, the fine data element being preferably a position measuring transformer of the type described in patent application S. N. 509,168, filed May 18, 1955, by R. W. Tripp and J. L. Winget, both cases being assigned to the assignee of the present application.

Such transformers may comprise two inductively related members movable with respect to each other, one fastened to each of the machine elements whose relative positions or motions are to be controlled. One member bears a continuous winding in the form of a multiplicity of conductors disposed in a plane parallel to the direction of relative motion of the members, the conductors extending transversely of that direction. The conductors are connected into a single series circuit so that adjacent portions carry current in opposite directions transversely of the length of the array. The second member bears two windings similar to the winding of the first member but usually shorter and disposed with respect to each other in space quadrature of the cycle defined on the continuous winding of the first member by the separation, center to center, of three adjacent conductors of that winding, the separation being taken in the direction of relative motion of the two members. The members are supported for relative motion with their windings at a small and constant separation, and the design of the windings is preferably such that the voltage induced in any of them by a current in a winding of the other member is a substantially sinusoidal function of the relative position of the members, cyclical in a change of relative position of the members equal to this pole cycle.

The rotor of each data element is driven to a null position depending upon the ratio of the sine and cosine current supplied to the quadrature windings. As the input information is digital in form, it is necessary to supply each of the data elements with currents corresponding to the sine and cosine of the sum of the angles determined by the digits of the input. For this purpose, the invention provides a circuit which will compute the necessary trigonometric functions.

The invention takes into account the fact that the sines and cosines of certain quadrantly related angles have the same numerical value in certain quadrants, while the sign of the sine and cosine changes.

The converter described here utilizes a decimal code in degrees and decimal degrees. The sines and cosines needed for the analog information are repeated naturally every 90 degrees. An object of the invention is to convert the decimal degrees of the digital input, over a range of four quadrants, to a "noval" number system having a repeating cycle of 90 degrees. This is accomplished by interchanging sine and cosine values and by changing their sign for angles within one quadrant from 0° to 90° to correspond to the sine and cosine of the larger angle extending over two or more quadrants as called for by said input.

A further object of the invention is to provide a converter which will accept input angular information in digital form, determine the quadrant of the shaft angle which is called for, establish values according to a trigonometric function of the angle called for by the digits of different values (decimally related in the case of base 10), obtain a ratio of sine to cosine signal depending upon the sum of the angles called for by the digits in the various groups, determine the sign of such signals and their assignment to quadrature windings of a data element, accomplish these steps for both coarse and fine data elements, overlap their operation, and drive a shaft to the desired angular position with very high accuracy. The invention also takes into account the fact that the number of poles of the coarse and fine data elements are quite different, viz., the coarse element may have two poles while the fine element may have a much larger number such as 144 poles.

The features of (1) overlapping the operation of data elements which operate at different speeds, (2) a converter which computes the trigonometric function for the sum of the angles called for by the digital information, such trigonometric functions being employed for energizing the quadrature windings of the coarse and fine data elements, and (3) stepping switches controlling the analog voltages, are described and claimed in the following patent application generically, such application specifically disclosing the use of these features as applied to converting digital input information in terms of linear distance into analog voltages representing the corresponding linear position of a driven element such as a machine slide: for Automatic Machine Control, filed in the name of Robert W. Tripp, and assigned to the assignee of the present application, Serial No. 540,429, filed October 14, 1955.

Once the above digital-to-analog conversion has been accomplished, standard procedure may be used for utilizing the resultant error signals generated at the output windings of the coarse and fine data elements for controlling the desired shaft rotation. Normal servo procedures may be used wherein the mechanical drive motor is actuated by these error signals in such a way as to reduce or tend to reduce these signals to zero or to a minimum value. This procedure includes use of a switch circuit to automatically shift the control from the coarse data element to the fine data element, the switch circuit being adjusted to operate at about ¼ cycle of the fine data element. When these error signals have been reduced to a sufficiently small value, the output shaft position is that required by the analog voltages and therefore that required by the input digital information.

Figs. 1 to 7 inclusive schematically illustrate an automatic machine control system according to the present invention, Fig. 8 being a key sheet illustrating how the other seven figures fit together.

Fig. 2 illustrates the 10° step computer.

Referring in detail to the drawings, the input 1 is here shown as angular data on a decimal basis including five groups of digits as follows:

Coarse, 0° to 300° in steps of 100°.
Coarse, 0° to 90° in steps of 10°.
Coarse and fine, 0° to 9° in steps of 1°, this being both coarse and fine, which overlap.
Fine input, .1° to .9° in steps of .1°.
Fine, .01° to .09° in steps of .01°.

Figure 1:
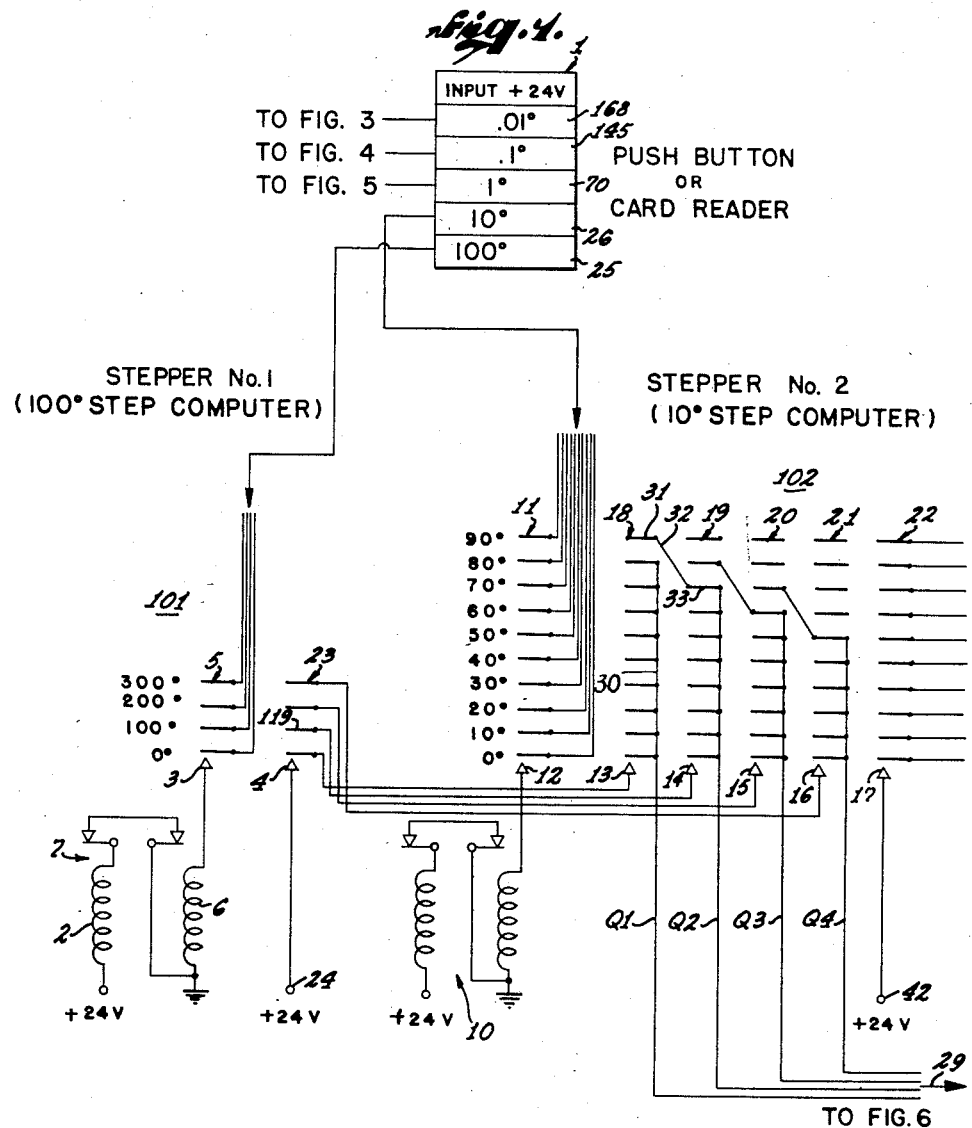
Fig. 1 illustrates the 100° and the 10° steppers.
Figure 3:
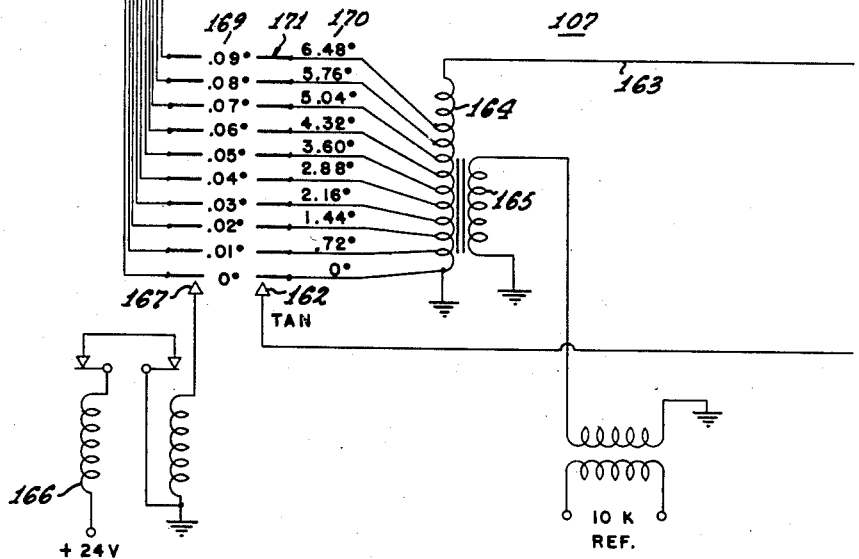
Fig. 3 illustrates the .01° computer.
Figure 4:
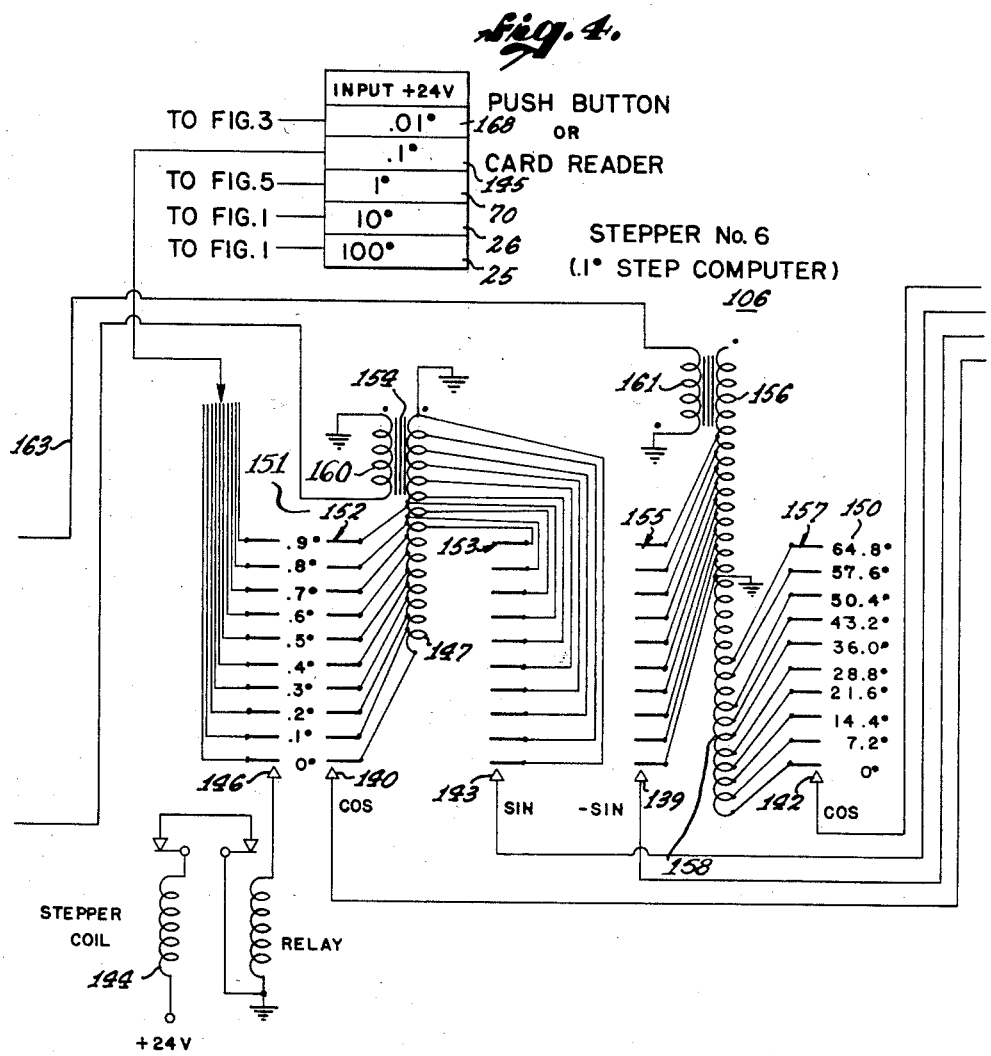
Fig. 4 illustrates the .1° step computer.
Figure 7:
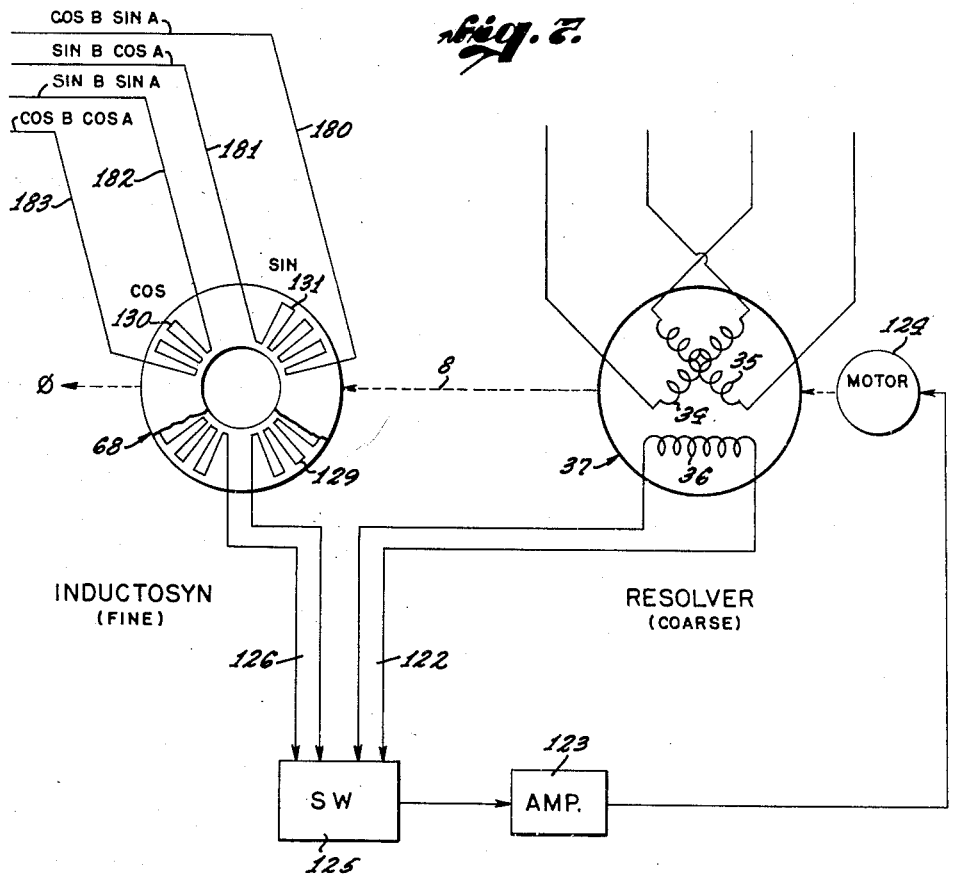
Figure 8:
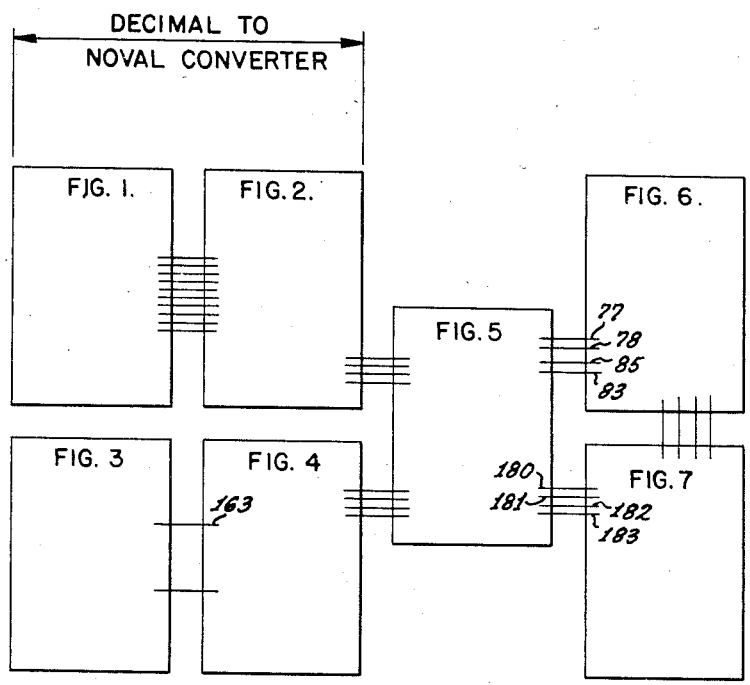

The above reference to degrees refers to the rotation of a shaft schematically shown at 8, in Fig. 7. The input 1 may be a card reader and it applies 24 volts in a column corresponding to the digit selected by a hole on the card, not shown, to apply this potential to operate the appropriate stepping switch as follows. Stepping switch 101, Fig. 1, has 100° steps as indicated and is operated by stepping magnet 7. Stepping magnet 7 has a stepping coil 2 which steps the wipers 3 and 4 until wiper 3 finds the contact in the bank 5 to which a potential of 24 volts has been applied by the card reader, whereupon the relay 6 opens the circuit of the stepping coil 2, as usual with a conventional rotary switch. Stepping switch 102, Fig. 1, is operated by stepping magnet 10 to select a switch contact in the bank 11 corresponding to the particular 10° step selected by the digit of the input. Switch 102 includes wipers 12, 13, 14, 15, 16 and 17, all of which make contact with the contacts in their respective banks 11, 18, 19, 20, 21 and 22.

The use of the various stepping switches like 101 makes it possible to provide an input control in the form of a perforated card to provide a wide range of analog voltages, without subjecting the card to such analog voltages, the card being subjected only to the operating potential here illustrated as 24 volts.

Switch 101 includes a contact bank 23 and its wiper 4 connects the 24 volt source indicated at 24 to one of the four contacts in the bank 23, to connect the 24 volt source to one of the four corresponding wipers 13, 14, 15 or 16 in the stepping switch 102. The 24 volt source indicated at 24 is thus extended out through one of the four corresponding quadrant lines Q1, Q2, Q3 and Q4, depending upon the levels at which the switches 101 and 102 are operated. Thus any angle set up in the input 1, in block 25 which includes 100 degree steps, or block 26 which represents 10 degree steps, results in putting a potential on one of the four lines Q1 to Q4, depending upon the quadrant in which the angle exists. It will be noted that all of the contacts in the bank 18 from zero to 80° are connected by a strap 30, to extend the connection from wiper 13 to line Q1 for angles from 0 to 80°, these angles being in the first quadrant represented by line Q1. The top contact 31 in the bank 18 is connected by a strap 32 to the contact 33 at the 70° level in the bank 19 with the result that when contacts 12 to 17 reach the 90° level, the 24 volt battery indicated at 24 is connected out through the lead Q2, representing the second quadrant. The reason for this is that the sine of 90° is the same as the cosine of zero, and when going from 80° to 90°, stepping switch 103, Fig. 6, is operated to convert the quadrants and perform two functions, namely: (1) Decide on the sign of sine and cosine which changes from quadrant to quadrant, and (2) decide on whether the value computed by the 10° computer switch 104, Fig. 2, and the 1° step computer switch 105, Fig. 5, will be supplied to the quadrature coils 34 and 35 in one order or in the reverse order.

The coils 34 and 35 are part of a coarse resolver 37, Fig. 7, having a rotatable coil indicated at 36. This resolver 37 is a conventional two pole resolver and the rotor 36 is driven to an angle determined by the sine and cosine of the sums of the angles established by the switches 104 and 105.

Hereafter will be given an explanation of the computation of the sine and cosine of the sums of angles, switches 104 and 105 serving to compute the sum of the 10° digit selected by switch 104 and the 1° digit selected by switch 105, while switches 107 and 106 compute the signal values for the sine and cosine of the sums of the .01° digit selected by switch 107 and the .1° digit selected by switch 106, the sum of that value and the 1° value selected by switch 105, also being computed for supply to the quadrature windings 130 and 131 of the fine data element 68.

In a similar way, the wiper 14 of switch 102 which is connected to the 100° level of switch 101 connects the 24 volt battery indicated at 24 from line Q2 to line Q3 when moving from the 70° level to the 80° level, 180° being taken as in the third quadrant. Also, the wiper 15 which is connected to the 200° level of switch 101, extends the connection of battery 24 from line Q3 to line Q4 when moving from the 60° level to the 70° level, as 270° is taken as being in the fourth quadrant.

The lines Q1, Q2, Q3 and Q4 are extended to the corresponding terminals Q11, Q12, Q13 and Q14 of stepper switch 103 which is a quadrant converter. Switch 103 has other similar contacts on corresponding levels, including contacts C1, C2, C3, C4 which are connected to the corresponding movable wipers C11 to C14 respectively, on the 10° step computer switch 104, Fig. 2. Switch 104 has a stepping magnet 40, all stepping magnets here shown being as described in connection with the stepping magnet 7 for switch 101. The relay 41 of stepping magnet 40 stops the advance of this switch, when the appropriate one of the wipers C11 to C14 as determined by which one of the contacts C1 to C4 is connected in circuit, finds the potential of battery 42 as controlled by wiper 17, at one of the banks of contacts controlled by the wipers C11 to C14.

Cable 27 in Fig. 2 and Fig. 6 represents the four conductors connecting wiper C11 to C14 to their respective contacts C1 to C4. Line 28 in Fig. 2 connects the relay 41 to wiper 91 in Fig. 6. Cable 29 in Fig. 1 represents the four conductors connecting the lines Q1 to Q4 to their contacts Q11 to Q14.

Switch 104 also has wipers C15 and C16. A reference source of potential 50, Fig. 2, is connected through grounded secondary winding 51 to a potentiometer 52 connected to ground at 53, winding 51 being reversely connected to potentiometer 54 and ground 55. The wiper C15 has a bank of stationary contacts indicated at 56 connected to potentiometer 52, in equal steps proportional to the ten degree steps shown. Potentiometer 54 has corresponding steps. The position of wipers C11 to C16 of switch 104 determines the value of sine picked off by wiper C15 and supplied to transformer primary winding 57, Fig. 5, that likewise determines the value of cosine picked off at that level and supplied by wiper C16 to transformer primary 58. Primary 58 is connected reversely with respect to winding 57 to obtain a negative product term as required for cosine $(a+b)$.

Figure 5:
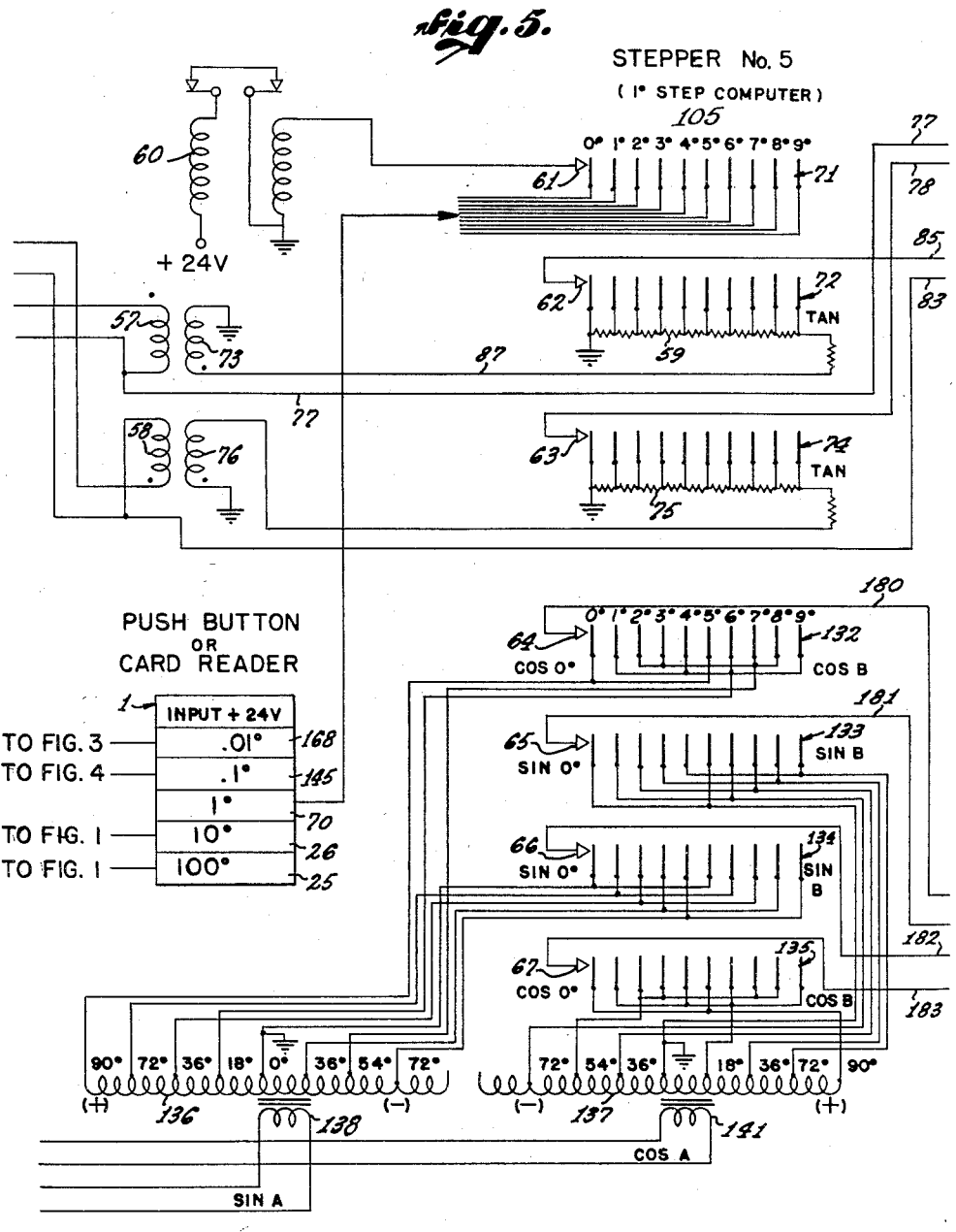
Fig. 5 illustrates the 1° step computer which overlaps control of the fine and coarse data elements illustrated in Fig. 7, Fig. 7 also showing these data elements controlling a servo to control the angular position of a shaft.
Figure 6:
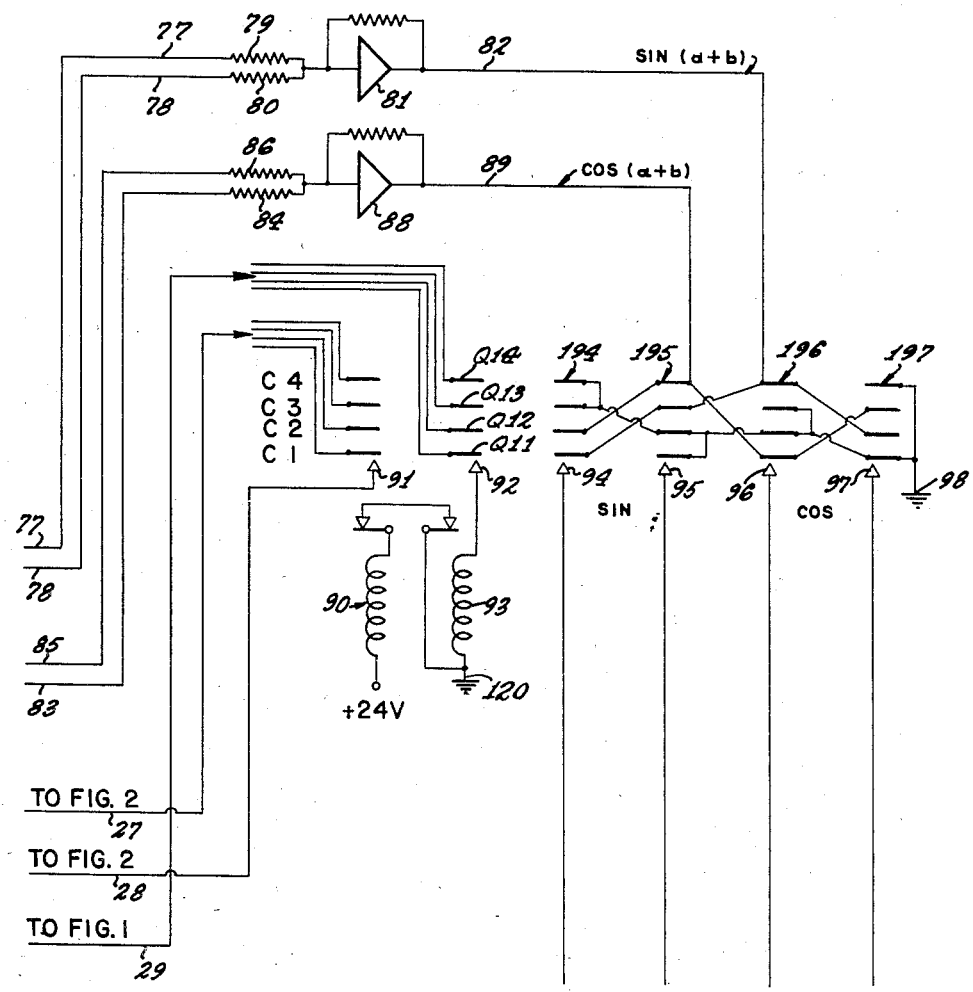
Fig. 6 illustrates the quadrant converter.

Switch 105, Fig. 5, is a 1° step computer having a stepping magnet 60 which moves its wipers 61, 62, 63 leading to the coarse resolver or coarse data element 37 as well as its wipers 64, 65, 66, and 67, Fig. 5, leading to the fine data element or position measuring transformer 68, determined by the particular digit represented by a hole in the input block 70. A hole at such digit, in units of degrees, puts a 24 volt potential on the corresponding one of the contacts in the bank 71 to determine the level to which switch 105 will operate. Wiper 62 controls a contact bank 72 leading to a step potentiometer 59, proportional to the tangent of the angle and in circuit with the secondary winding 73 which is energized by primary winding 57. Also switch 105 has a bank of contacts 74 controlled by wiper 63 and connecting a potentiometer 75 in equal steps proportional to the tangent, this potentiometer being in circuit with secondary winding 76 energized by primary winding 58. Line 77 is connected to the input side of primary 57 to pick off a value proportional to sine $(a)$, assuming $a$ represents the angle that is determined by switch 104, while the line 83 picks off a signal value proportional to the cosine $(a)$, which value of cos $(a)$ is also fed to secondary 76, and multiplied by tan $(b)$ and picked off in steps by wiper 63, assuming angle $b$ represents the angle selected by that switch. The line 77 includes a mixing resistance 79 and line 78 includes a mixing resistance 80, these mixing resistances supplying through amplifier 81 to line 82 a signal value proportional to sin $(a+b)$. Similarly the line 83 supplies to the mixing resistance 84 a signal value proportional to cos $(a)$, while the line 85 supplies to the mixing resistance 86 a signal value proportional to the product of sine $(a)$, from the output line 87 of secondary 73 and the tan $(b)$ as determined by wiper 62, this latter value being negative in sign as explained above. The mixing resistances 84 and 86 and amplifier 88 supply to the line 89 a signal value proportional to cos $(a+b)$.

The following table illustrates the double function performed by the quadrant converter switch 103. In the following table, the line 82 carries a signal of sin $(a+b)$, line 89 carries a signal of cos $(a+b)$, 34 is the resolver coil to receive values according to sin $(\phi)$, and 35 is the resolver coil to receive signal values according to cos $(\phi)$.

| Quadrant | Winding | |
|---|---|---|
| | 34 | 35 |
| 1 | +82 | +89 |
| 2 | +89 | −82 |
| 3 | −82 | −89 |
| 4 | −89 | +82 |

Switch 103 includes a stepping magnet 90 having wipers movable to the four positions shown. Wiper 91 controls connection with the contacts C1 to C4. Wiper 92 which is in circuit with the relay coil 93 moves to seek the potential of battery indicated at 24 in Fig. 1 and controls the connection of the bank of contacts Q11 to Q14. The remaining wipers 94, 95, 96 and 97 control the connections of lines 82 and 89 to coils 34 and 35 to ground 98, in the four quadrants as shown by the above table, thus performing the double function of deciding on the sign of the sine current in line 82 and the cosine current in line 89, and also deciding on the assignment of these two currents to the quadrature coils 34 and 35, as described above.

Wipers 94 to 97 control contact banks 194 to 197 respectively, these banks being cross connected and connected to lines 82 and 89 and to ground 98 as shown and for the purpose above explained.

To consider the operation of the switch 104 in further detail, the particular one of the wipers C11 to C14 which is in circuit at any one time, as selected by wiper 91, seeks the potential of battery 42 controlled by wiper 17 of switch 102, to determine the level at which the relay 41 of stepping magnet 40, will stop the advance of this switch 104. The wipers C11 to C14 correspond to the quadrants Q1 to Q4 respectively. Wipers C11 to C14 respectively control connection with contact banks 111 to 114. The slant connections like 115 from the 0° contact in bank 111 to the 10° contact of the next bank 112, in effect add 10° to the level at which each succeeding quadrant line, such as the one connected to wiper C12, will find the potential to operate the relay 41, to stop the advance of switch 104. For example, if we assume that the input information calls for a shaft rotation of 80°, which is in the first quadrant, wiper 3 of switch 101 will be at 0°, and wipers 12 to 17 of switch 102 advance to the 80° level, and as wiper C11 of switch 104 is now effective, it will advance to the 80° level of switch 104, as required, as stepping magnet 40 finds the potential of battery 42 at the 80° level of its switch 104, via lead 108, this circuit being completed through line 28, contact C1, cable 27 to wiper C11. At this time the quadrant converter switch 103 is in its first quadrant position with wiper 92 on contact Q11, as relay 93 is thereby connected through cable 29, line Q1, wiper 13, wiper 4 and battery 24.

If we now assume that the input information calls for 90°, wiper 3 of which switch 101 is still at 0°, and wipers 12 to 17 advance to the 90° level of switch 102. Wiper 17 now connects its battery 42 by way of line 116 stepwise to the third contact of bank 114 and to the second contact of bank 113, and to the first contact 117 in the bank 112. With 24 volts of source 42 on contact 117, switch 104 remains with its wipers C11 to C14 at the first level, but the sine of 90° is 1, not 0 as is now picked off at wiper C15, and the cosine of 90° is 0 not 1 as picked off by wiper C16 at 0° level. These values are interchanged, that is, the trigonometric functions in lines 82 and 89 are interchanged with respect to the quadrature coils 34 and 35, as switch 103 advances to its second quadrant position, as its stepping magnet 90, like the other stepping magnets, is self-acting until its relay 93 finds 24 volts of source 24 which it does through wiper 92, contact Q12, cable 29, second quadrant line Q2, strap connection 32, contact 31, wiper 13, wiper 4 to source 24. With switch 103 in its second quadrant position, the sine signal value in line 82 is now supplied to the cosine coil 35, while the cosine signal value in line 89 is supplied to the sine coil 34, as described in connection with the above table. Switch 103 remains in its second quadrant position for the following example of an input of 100°.

Again, assume that the input information calls for a shaft rotation of 100°. Switch 101 advances to its 100° level, while switch 102 is at the 0° level. Battery 24 now finds a circuit through wiper 4 contact 119, wiper 14, line Q2, cable 29, contact Q12, relay 93 to ground 120, whereby wipers 91, 92 and 94 to 97 advance to the second quadrant position. Ground 39 at relay 41 is thus connected through line 28 to contact C2, cable 27 and wiper C12 which moves to its contact 121 at the 10° level of its switch 104, battery 42 being advanced by connection 115 from the 0° level of switch 102 to the 10° level of the second quadrant bank 112 of switch 104 as explained above. Hence the input information of 100° is transmitted by wiper C15 of switch 104 as the sine of 10° and is transmitted by wiper C16 as the cosine of that angle, the second quadrant position of switch 103 performing the double duty of deciding the sign of the signal values and also their assignment to the coils 34 and 35 in accordance with the above table.

Wiper C11 operates for input information from zero to 80°; wiper C12 operates from 90° to 170°; wiper C13 operates from 180° to 260°; and wiper C14 operates from 270° to 350°, the units value of the degrees being determined by switch 105 while the first decimal digit is determined by switch 106, and the second decimal digit is determined by switch 107.

It is believed that the operation of switches 102, 103, 104 and 105 for values in other quadrants will be apparent from the above explanation which proceeds to the description of the signal values supplied to the fine data element 68.

The fine data element 68 has a rotary coil 129 which assumes a position determined by the sum of the angles determined by the input information supplied to switches 105, 106 and 107. Data element 68 has quadrature coils 131 and 130, the former receiving values according to the sine of the sums of the angles in question, while the coil 130 receives signal values according to the cosine of the sum of those angles. Data element 37 may be a conventional 2 pole resolver, while data element 68 may have a much larger number of poles, such as 144. Also, data element 68 may be a positioning measuring transformer described and claimed in the patent application S. N. 509,168 referred to above.

Switch 105 has a contact bank 132 for wiper 64 and contact banks 133, 134 and 135 for wipers 65 to 67 respectively, as well as contact banks 71, 72 and 74 referred to above. The banks 132 to 135 are connected to taps on the transformer secondary windings 136 and 137 as shown, to pick off various sine or cosine values of the electrical wave as shown. Winding 136 has a primary winding 138 connected to wipers 139 and 140 of switch 106, while winding 137 has a primary 141 connected to wipers 142 and 143. Switch 106 has a stepping magnet 144 controlled by the digital input information in the block 145 which designates the angular position of shaft 8 in terms of tenths of a degree. Stepping magnet 144 moves its wiper 146 to the level selected by the input information in block 145, to therefore move wiper 140 to a level to pick off a signal value corresponding to the cosine of the corresponding angle of the electrical wave as indicated in the column 150, bearing in mind that each .1° of shaft rotation as represented in column 151 corresponds to 7.2° of electrical wave of the data element 68 which has 72 cycles. Wiper 140 picks off a value of the cosine of the electrical wave shown in column 150, corresponding to the shaft angle called for as shown in column 151. Wiper 143 picks off a signal value corresponding to the sine of the electrical wave and wiper 142 picks off a value corresponding to the cosine of the electrical wave. Wiper 140 controls the contact bank 152 connected to appropriate taps of the secondary coil 147. Wiper 143 controls the connection to a contact bank 153 connected to appropriate taps on the secondary coil 154. Wiper 139 controls the connection to a contact bank 155 connected to taps on the secondary coil 156 and wiper 142 controls a contact bank 157 connected to taps on the secondary coil 158. The heavy dots adjacent to secondary coils 154 and 156 indicate that one of them is reversed with respect to the other to obtain the proper sign of the trigonometric function referred to below. Secondary coils 147 and 154 are fed by a primary winding 160 while secondary coils 156 and 158 are fed by a primary winding 161.

Primary 160 is connected to the wiper 162 of switch 107 and primary 161 is connected by a line 163 to one end of a secondary coil 164 which is supplied with a suitable reference voltage such as 10 kc. by a primary winding 165.

Switch 107 has a stepping magnet 166 which moves its wipers 167 and 162 to the level determined by the hole in the card in block 168 which contains the digital input information in terms of hundredths of a degree of the desired shaft rotation which is indicated by column 169, the corresponding electrical wave of the data element 68 being shown in column 170.

Wiper 162 makes connection with contact bank 171 connected to secondary winding 164 in proportion to the tangent of the electrical wave from zero to 6.48°, in steps of .72°.

If we assume for the moment that the angle selected by switch 107 is represented by $b$ and that the angle selected by switch 106 is represented by $a$, then the windings 138 and 141, Fig. 5, will receive signals proportional to the sine and cosine of the sums of these angles for the following reasons:

$$\text{Sin } (a+b) = \sin a \cos b + \cos a \sin b \quad (1)$$
$$\text{Cos } (a+b) = \cos a \cos b - \sin a \sin b \quad (2)$$

If we divide both of the above equations by cos $(b)$, the right hand sides of these equations become:

$$\text{Sin } (a) + \cos (a) \tan (b) \quad (3)$$
$$\text{Cos } (a) - \sin (a) \tan (b) \quad (4)$$

The electrical analog of Equations 1 and 2 is used in switches 105 and 106 where the angle of the electrical wave is large. A saving in the number of switch elements is effected by using the electrical analog of Equations 3 and 4 in switch 107 where the angle of the electrical wave is smaller, without affecting the operation of the fine data element, 68 as its rotary winding 129 assumes a vector position which depends on the ratio of the signal supplied to the quadrature windings 130 and 131, not on the absolute value of those signals.

The product terms of all of the above equations are picked off by supplying to a transformer a value according to one term and by tapping off a selected portion of the secondary voltage in accordance with the second term, while the sign is determined by the manner in which the circuits are connected as referred to above. This is described and claimed in the patent application referred to above.

Primary winding 138 receives a signal proportional to the sine of the sum of the shaft angles selected by switch 106 (angle $a$) and switch 107 (angle $b$), corresponding to the values shown in Equation 3, the value sin $(a)$ being picked off by wiper 139, primary 161 receiving a unity value of voltage, while wiper 140 picks off the value of cos $(a)$ from a particular tap in bank 152, this voltage being multiplied by the value of tan $(a)$ supplied to primary winding 160, as picked off by wiper 162. The primary winding 141 receives a signal value proportional to cos $(a+b)$ as shown by Equation 4, as the wiper 142 picks off a value proportional to cos $(a)$, and wiper 143 picks off a value proportional to sin $(a)$ from one of the contacts in bank 153 and multiplied by tan $(a)$ supplied to primary winding 160.

The various taps shown in Fig. 5 are taken out from secondary winding 136 to the bank 132 of switch 105 so that the steps of 1° of shaft rotation find their electrical equivalent in the cosine value of the electrical wave. The steps of the electrical wave for secondary windings 136 and 137 are 72°, being one tenth of this or 7.2° at bank 157 of switch 106 and being .72° at bank 170 of switch 107. The corresponding sine value of the electrical wave in steps of 72° is connected to the contacts of the bank 133, the sine steps are connected to contact bank 134 and the cosine values are connected to the steps of bank 135, with reversal of sign in one of the circuits as explained below. Now assuming that $a$ represents the shaft angle determined by both of the switches 106 and 107, while $b$ represents the shaft angle called for by the setting of switch 105, it will be apparent that the coils 131 and 130 are respectively supplied with current proportional to the sine and cosine of the sum of those angles for the following reasons.

Line 180 which connects wiper 64 to one terminal of coil 131 carries a value of cos $(b)$ picked off by wiper 64 from coil 136 and multiplied by sin $(a)$ supplied to primary 138. Line 181 which connects wiper 65 to the other terminal of coil 131 picks off a value of sin $(b)$ multiplied by cos $(a)$ supplied to primary 141. The sum of signals according to the above terms corresponds to Equation 1 above, so that coil 131 receives a signal value proportional to sin $(a+b)$. Line 182 connects wiper 66 to one terminal of coil 130 and picks off a value of sin $(a)$ sin $(b)$ while line 183 connected to the other side of that coil picks off a value of cos (*b*) cos (*a*). The voltages in lines 182 and 183 are both taken on a similar side of windings 136 and 137 with respect to ground and hence these values are subtracted, whereby the current in the lines 182, 183 corresponds to Equation 2 above. Coil 130 thus receives a signal value proportional to the cosine of the sum of the angles in question.

As explained in detail in the above-mentioned patent application, both sine and cosine values, with proper regard to plus or minus values, are taken from the same winding 136, and the same applies to the winding 137, by wipers 64 to 67 of the switch 105, Fig. 5, by providing these windings with five taps, in steps of 18°, on opposite sides of its mid-tap. The fine data element 68 has a repeating cycle of 5°, and input information for it is obtained from stepper 105 along with the information for the resolver 37. Since the steps of switch 105 are 1° of shaft rotation, the voltages obtained from wipers 64 to 67 must correspond to the sine and cosine of the coupling wave of fine data element 68, with 72 degree steps, as data element 68 in having 144 poles has 72 cycles per revolution of shaft 8. This means that stepper 105 will go through ten times 72° or 2 cycles of variation over its complete range of ten 1° steps of shaft rotation. The circuit diagram of Fig. 5 shows how this is accomplished by making use of correctly tapped transformer windings 136, 137, and the four banks of contacts 132 to 135 on stepper 105. The degree numbers on the taps of windings 136 and 137 correspond to the sine of the angle with the algebraic signs giving the sense of the voltage generated at that point.

The following table gives the relation between the contacts of banks 132 to 135 with reference to shaft rotation, and the electric wave of the fine data element 68.

| Contacts of banks 132–135 with reference to shaft rotation | Wave of fine data element 68 |
| --- | --- |
| *Degrees* | *Degrees* |
| 0 | 0 |
| 1 | 72 |
| 2 | 144 |
| 3 | 216 |
| 4 | 288 |
| 5 | 360 |
| 6 | 432 or 72 |
| 7 | 504 or 144 |
| 8 | 576 or 216 |
| 9 | 648 or 288 |

Referring to the contact bank 132, the 0° contact is in multiple with the 5° contact as cosine 0°=cosine 360°, and both of these contacts are connected to the +90° terminal of winding 136, as cosine 0°=sine of 90°. The 1° contact of bank 132 is in multiple with the 4° contact and with the 6° contact and with the 9° contact, as the corresponding electric waves, namely, 72°, 288°, 432°, and 648° all have the same cosine value as 72°, which in turn is the same as the sine of 18°, the terminal for which on winding 136 is connected to the four contacts mentioned. The 2°, 3°, 7°, and 8° terminals of bank 132 are connected in multiple as they all have cosine values the same as cosine 144° which in turn is the same as — sin 36°, these contacts being connected to the corresponding negative terminal of winding 136. It will be apparent that various other taps shown for winding 136 supply the sine values for bank 134. In a similar manner, the sine and cosine values for banks 133 and 135 are obtained from taps on winding 137.

Switch 105 overlaps the operation of the coarse data element 37 and the fine data element 68, in designating the same amount of rotation of shaft 8 at each of its unit steps.

Referring to Fig. 7, the error signal in the output circuit 122 of the coarse data element 37 may be employed in the usual servo system as shown wherein this signal is amplified by servo amplifier 123, and supplied to motor 124 which drives the shaft 8 to reduce this error signal to null. When the error signal in the output 122 reaches a suitable small value, switch 125 operates to switch the output circuit 126 of the fine data element into control so that its error signal determines the fine angular adjustment of shaft 8. For further details of a switch like 125 and servo circuit which may be used, reference may be made to pages 81 to 88 and elsewhere of the following book: vol. 25, Radiation Laboratory Series, "Theory of servo-mechanisms" by James et al., published 1947 by McGraw-Hill Book Co.

Various modifications may be made in the invention without departing from the spirit of the following claims.

I claim:

1. A digital-to-analog converter comprising means for supplying a digital input in terms of angular position of a shaft, a stepping switch, means responsive to said digital input to operate said switch to different positions, a plurality of data elements having different ranges of operation, each of said data elements having quadrature windings, a source of sine and cosine signal voltages for the quadrature windings respectively of each of said data elements controlled by said switch, and a servo amplifier and motor for said shaft controlled by said data elements.

2. A digital-to-analog converter comprising means for supplying a digital input as a decimal number representing desired angular travel of a shaft, a rotary stepping switch having ten positions and having a stepping magnet, a circuit responsive to said digital input to operate said magnet and move said switch to any one of said positions as determined by said input, said switch comprising means for supplying different signal values, and means for translating a signal value selected by said switch into the corresponding angular movement of said shaft.

3. A digital-to-analog converter comprising an input having a group of digits of a certain angular value and another group of digits of another angular value, said values representing the angular position of a shaft, a data element for producing an error signal pertinent to the angular position of said shaft, said data element having relatively rotatable members one of which has quadrature windings, and a computer responsive to said input for supplying to said quadrature windings respectively signals proportional to the sine and cosine respectively of the sums of the angles pertinent to the displacement of said data element members corresponding to the input value represented by a particular digit of each of said digital groups.

4. A digital-to-analog converter comprising an input having a group of digits of a certain value in terms of angular position of a shaft, a stepping switch having ten positions and having a stepping magnet, a circuit responsive to said digital input to operate said magnet and move said switch to one of ten positions as determined by said input, a data element having quadrature windings, a transformer for supplying current to said windings, said switch having a corresponding set of ten contacts connected to said transformer in steps of electrical degrees of the electrical wave of said data element corresponding to the angular digits of said input.

5. A digital-to-analog converter comprising means for supplying a digital input as groups of digits of decimal numbers representing desired angular position of a shaft, a rotary stepping switch for each of said groups of digits, each of said switches having ten positions and a stepping magnet, a circuit responsive to the digital input in each of said groups to operate one of said magnets and move its switch to any one of said positions as determined by said input, one of said switches comprising means for supplying different signal values of a range of values, and another of said switches comprising means for supplying different signal values in another range of values decimally related to said first range, and means for angularly positioning said shaft by the combined signal values selected by a plurality of said switches.

6. A digital-to-analog converter comprising means for supplying a digital input as a group of decimal digits representing angular position of a shaft, a rotary stepping switch having ten positions and a stepping magnet, a circuit responsive to said digital input to operate said magnet and move said switch to any one of said positions as determined by said input, said switch having a bank of ten contacts providing input voltages corresponding to the sine and cosine functions of angular position of said shaft as designated by said input, said shaft having a data element having quadrature windings for said sine and cosine functions respectively, said data element having cooperating windings providing an error signal, and a servo amplifier and motor responsive to said error signal for operating said shaft.

7. A digital-to-analog converter comprising an input having a group of digits $a$ of a certain angular value and another group of digits $b$ of another angular value, said values representing the angular position of a shaft, a transformer controlled by said input, said transformer having primary and second windings, means for supplying to said primary winding a variable signal corresponding to a trigonometric function of angle $a$, said secondary winding having taps in steps proportional to a trigonometric function of angle $b$, said secondary winding comprising means for supplying a signal proportional to the product of said trigonometric functions, and $a$ and $b$ having relative values of 10 to 1, a data element controlled by said signal for producing an error signal, and a servo amplifier and motor controlled by said error signal for controlling said shaft.

8. A digital-to-analog converter comprising an input having a group of digits $a$ of a certain angular value and another group of digits $b$ of another angular value, said values representing the angular position of a shaft, a transformer controlled by said input, said transformer having an input in steps of sin $(b)$ and a secondary winding having steps of tan $(a)$, another transformer having an input in steps of cos $(b)$, said other transformer having a secondary winding, and a circuit combining the outputs of said secondary windings and comprising a source of signal proportional to cos $(b)$—tan $(a)$ sin $(b)$, where $a$ and $b$ are angles having relative values of 10 to 1, means for translating said signal into an error signal, and means for translating said error signal into angular movement of said shaft as designated by said input.

9. A digital-to-analog converter comprising an input having a group of digits $a$ of a certain value and another group of digits $b$ of another value, said values representing the angular position of a shaft, a transformer controlled by said input, said transformer having an input in steps of cos $(b)$ and a secondary winding having steps of tan $(a)$, another transformer having an input in steps of sin $(b)$, said other transformer having a secondary winding, and a circuit combining the outputs of said secondary windings and comprising a source of signal proportional to tan $(a)$ cos $(b)$+sin $(b)$, where $a$ and $b$ are angles having relative values of 10 to 1, means for translating said signal into an error signal, and means for translating said error signal into angular movement of said shaft as called for by said input.

10. A digital-to-analog converter comprising an input having a group of digits $a$ of a certain value and another group of digits $b$ of another value, said values representing the angular position of a shaft, a transformer controlled by said input, said transformer having an input in steps of sin $(a)$, another transformer having an input in steps of cos $(a)$, each of said transformers having two secondary windings of which one has taps in steps of sin $(b)$ and the other has taps in steps of cos $(b)$, and circuits for combining the output of each secondary winding of one transformer with a secondary winding of the other transformer to form signals proportional to the sine and cosine of $(a)+(b)$ respectively, where $a$ and $b$ are angles having relative values of 10 to 1, and means for translating said signals into the angular position of said shaft as designated by said input.

11. A digital-to-analog converter comprising an input having groups of digits representing the angular position of a shaft, said input embracing an angular extent of more than one quadrant, a data element having quadrature windings, a computer for computing and supplying signal values corresponding to the sine and to the cosine of the sums of the angles designated by said input, a quadrant converter switch for supplying said sine signal to one of said quadrature windings and for supplying said cosine signal to said other winding, and means responsive to said input to operate said switch and control the sign of each of said signal values as well as the assignment thereof to said windings in accordance with the corresponding sine and cosine values of angles from 0° to 90°.

12. Means for supplying angular input information in terms of angles, on a decimal basis, for an extent greater than one quadrant, and means responsive to said supplying means for converting said input information into a signal having the equivalent value and sign of a trigonometric function of an angle within one quadrant.

13. A digital-to-analog converter for supplying voltages representing angular shaft positions, said converter comprising an input of angular data, a hundreds stepper, a tens stepper and a units stepper, each of said steppers comprising a stepping switch controlled by said input, said hundreds stepper having four steps of 0°, 100°, 200°, and 300°, said tens stepper having ten steps from 0° to 9°, a computer for computing voltages corresponding to the sine and the cosine of the sums of the angles designated by said tens and units steppers, and a quadrant switch controlled by said hundreds and tens steppers for interchanging and reversing the sign of said sine and cosine voltages appropriate to a particular one of the quadrants of said input.

References Cited in the file of this patent
UNITED STATES PATENTS

| 2,656,497 | Schweighofer | Oct. 20, 1953 |
| 2,727,570 | Hempel | Dec. 20, 1955 |